(12) United States Patent
Clark et al.

(10) Patent No.: US 8,764,091 B2
(45) Date of Patent: Jul. 1, 2014

(54) CLUSTER FINISH PANEL WITH UNIQUE CONTROLLED RELEASE BREAKAWAY BRIDGE BEZEL DESIGN

(75) Inventors: Scott A. Clark, Ypsilanti, MI (US); Mark Wells, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 13/517,741

(22) Filed: Jun. 14, 2012

(65) Prior Publication Data

US 2013/0334835 A1 Dec. 19, 2013

(51) Int. Cl.
*B60R 21/205* (2011.01)
(52) U.S. Cl.
USPC .............................................. 296/70; 208/750
(58) Field of Classification Search
CPC ...................................................... B62D 25/14
USPC .......................... 296/70, 72; 280/750; 180/90
See application file for complete search history.

(56) References Cited

U.S. PATENT DOCUMENTS

| 5,026,092 | A | 6/1991 | Abramczyk |
| 7,150,488 | B2 | 12/2006 | Kornylo et al. |
| 7,913,790 | B2 | 3/2011 | Tanaka et al. |
| 2006/0186650 | A1 * | 8/2006 | Kuwano et al. ............... 280/732 |

FOREIGN PATENT DOCUMENTS

| DE | 19535556 | 11/1996 |
| JP | 6247320 | 9/1994 |

* cited by examiner

*Primary Examiner* — Joseph Pape
(74) *Attorney, Agent, or Firm* — Vichit Chea; Price Heneveld LLP

(57) ABSTRACT

A cluster panel assembly comprising a bridge bezel operably and releasably coupled to a surround bezel is disclosed, wherein the bridge bezel is disposed adjacent a steering column and further comprises a plurality of attachment locations for coupling the bridge bezel to the surround bezel, wherein the attachment locations comprise a set of fasteners adapted to be released in a car-forward sequence as an impact load is imparted on the bridge bezel from the steering column during a collision event.

17 Claims, 3 Drawing Sheets

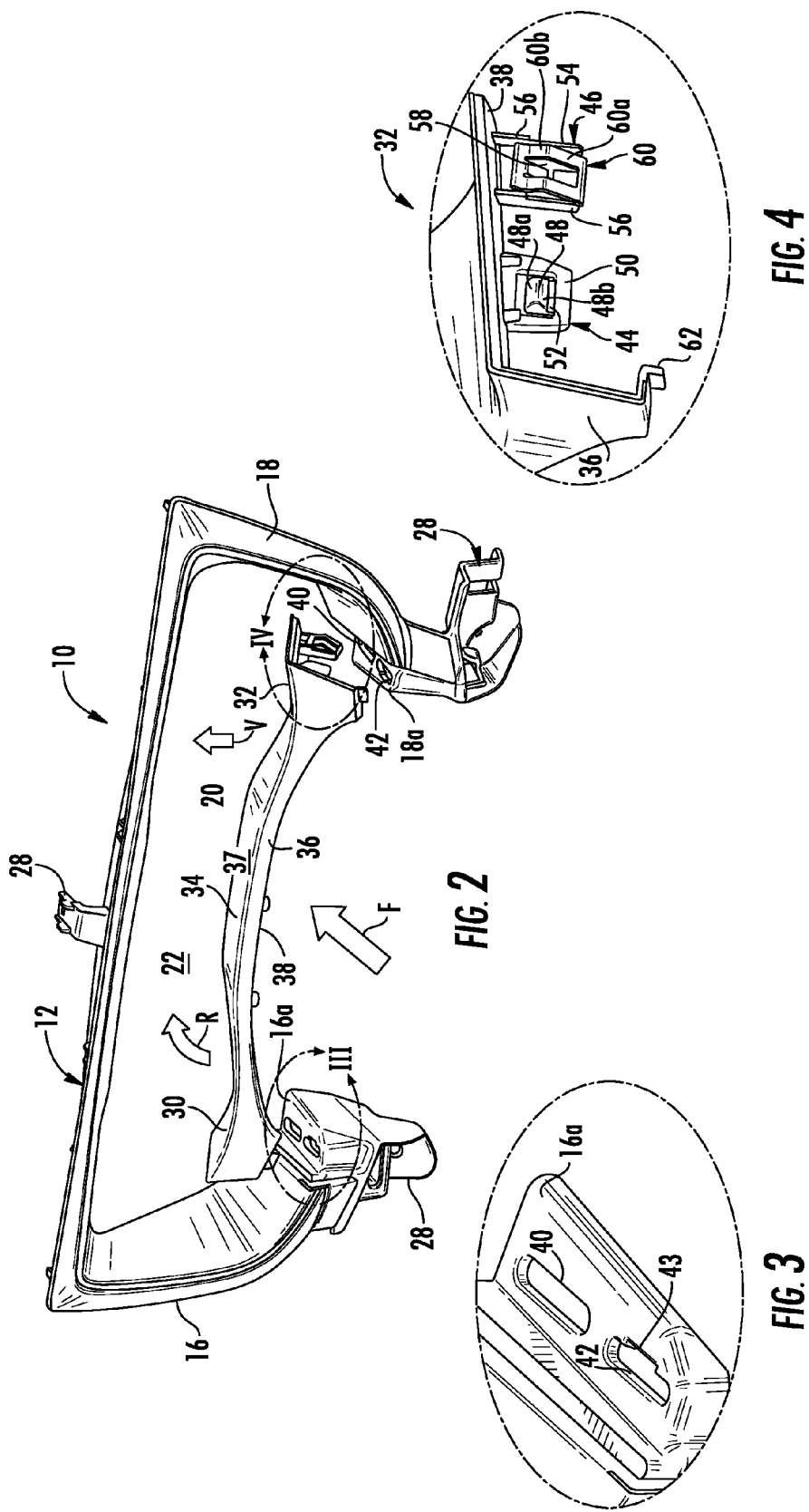

CLUSTER FINISH PANEL WITH UNIQUE CONTROLLED RELEASE BREAKAWAY BRIDGE BEZEL DESIGN

FIELD OF THE INVENTION

The present invention generally relates to cluster finish panel as included in a vehicle instrument panel, and, more particularly, to a cluster finish panel having a controlled release breakaway bridge bezel design for releasing the bridge bezel as an impact load is realized on a steering column during a collision event.

BACKGROUND OF THE INVENTION

A steering column in a vehicle interior is designed to travel car-forward in response to a collision event of the vehicle with an outside object, wherein a vehicle occupant disposed adjacent the steering column will impart a force on the steering column in response to the collision event. Further, during a collision event, an airbag can be deployed, which also causes car-forward movement of the steering column. Increased amount of column travel can provide a safer environment for a vehicle occupant during a collision event. The increased travel of the steering column in a car-forward direction is necessary to achieve specific standards in the auto industry. As such, there is a need to provide a finished instrumentation cluster panel having the necessary components to provide breakaway portions that will not impede the travel of the steering column in a car-forward direction during a collision event.

The present invention provides a cluster finish panel having a controlled release breakaway bridge bezel attached to a surround bezel that is designed to breakaway from the surround bezel as a force is imparted on the bridge bezel in a car-forward direction from a steering column during a collision event. The present invention further provides a breakaway bezel that is designed to have a decreased amount of force necessary to release the bridge bezel from the surround bezel, so as not to impede the car-forward movement of the steering column during a collision event.

SUMMARY OF THE INVENTION

According to one aspect of the present invention, a cluster panel assembly comprises a surround bezel having first and second attachment landings. A bridge bezel having first and second ends aligns with and couples to the first and second attachment landings of the surround bezel. The cluster panel assembly further comprises first and second fasteners disposed on each of the first and second ends of the bridge bezel that are adapted to releasably engage the attachment landings of the surround bezel. The bridge bezel is disposed adjacent a steering column capable of imparting a force on the bridge bezel causing a first movement of the bridge bezel in the form of a rotational movement of the bridge bezel which causes a disengagement of the first fasteners of the bridge bezel from the surround bezel. Further, the force imparted by the steering column causes a second movement subsequent to the first movement of the bridge bezel in the form of a vertical movement of the bridge bezel which causes a disengagement of the second fasteners from the surround bezel as the steering column proceeds in a car-forward direction.

According to another aspect of the present invention, a cluster panel assembly comprises a bridge bezel releasably coupled to a vehicle interior and disposed adjacent a steering column. The bridge bezel further comprises at least two attaching ends for coupling the bridge bezel to the vehicle interior. The attaching ends comprise first and second fasteners adapted to be released in a controlled car-forward sequence as an impact load is imparted on the bridge bezel from the steering column during a collision event.

According to yet another embodiment of the present invention, a cluster panel assembly comprises a bridge bezel releasably coupled to a surround bezel by a plurality of fasteners. The bridge bezel is disposed adjacent a steering column in assembly, and a tether assembly is operably coupled to both the steering column and the bridge bezel. The fasteners of the bridge bezel are adapted to be released in a car-forward release sequence as an impact load is imparted on the bridge bezel from the steering column during a collision event.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 2 is a front perspective view of the cluster finish panel of FIG. 1 with the breakaway bridge bezel being removed therefrom;

FIG. 3 is a fractional perspective view of bridge bezel attachment locations as found in FIG. 2 at circle III;

FIG. 4 is a fractional perspective view of clips disposed on a breakaway bridge bezel, as shown in FIG. 2 at circle IV.

DETAILED DESCRIPTION OF PREFERRED EMBODIMENTS

Figure 1:
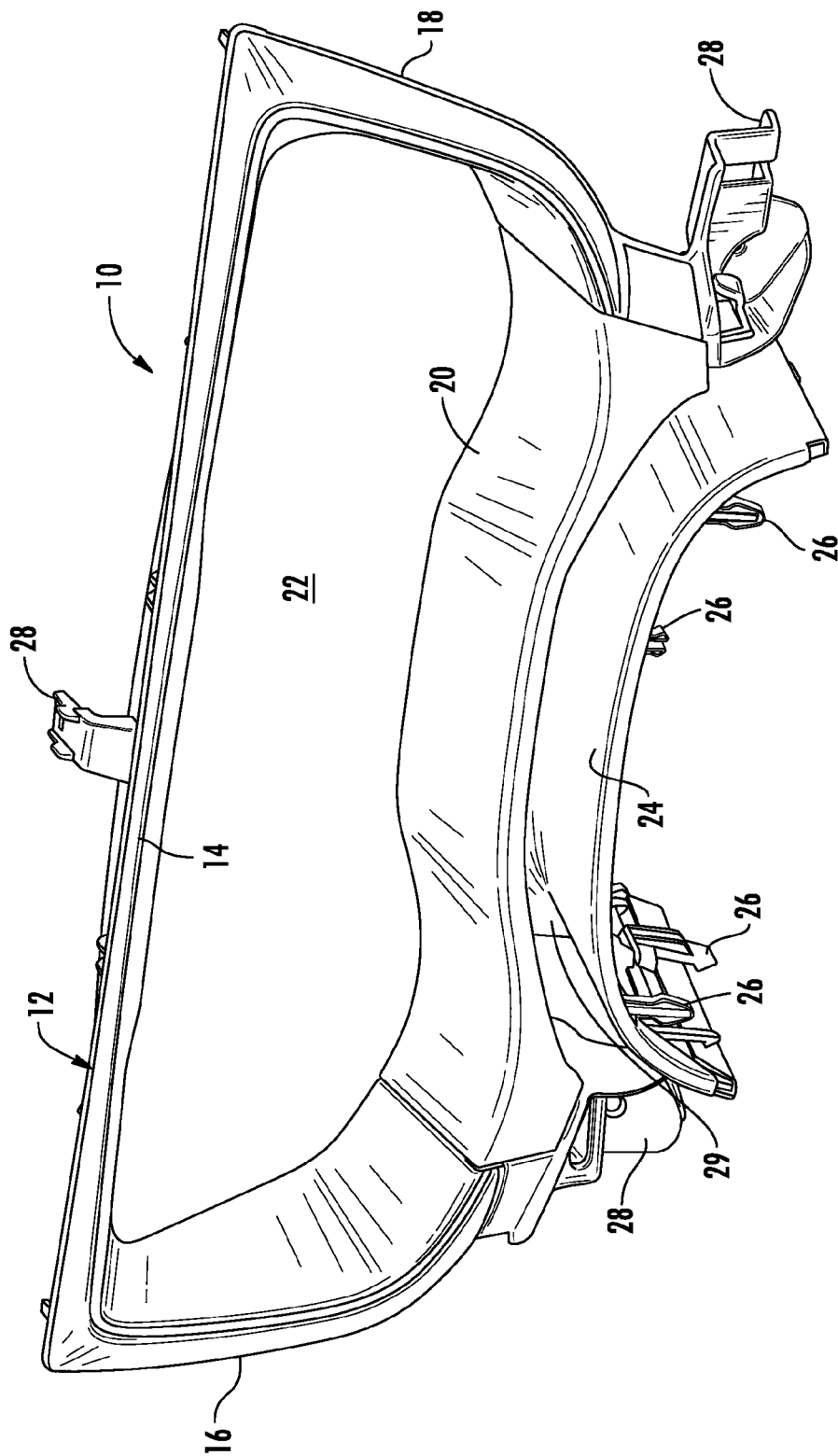
FIG. 1 is a front perspective view of a cluster finish panel having a breakaway bridge bezel according to embodiments of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring to FIG. 1, the reference numeral 10 generally designates a cluster finish panel as found in a vehicle interior, and, more specifically, as found on a vehicle instrument panel on a driver's side of the vehicle interior. The cluster finish panel 10 includes a surround bezel 12, which comprises an upper cross bar portion in the form of an upper wall 14 which connects to two side walls 16 and 18 at opposite ends, such that the surround bezel 12 has a generally inverse U-shaped configuration. Side walls 16, 18 are used to releasably couple a breakaway bridge bezel 20 assembly to the surround bezel 12, as further described below. As arranged in FIG. 1, the surround bezel 12 and bridge bezel 20 define an instrumentation region 22 where various vehicle instruments can be disposed for viewing by the vehicle occupant. As shown in FIG. 1, an upper shroud 24 has a generally arcuately-shaped configuration with retainer clips 26 disposed on an underside thereof for retaining the upper shroud 24 on a steering column (not shown). As further shown in FIG. 1, the side walls 16, 18 and upper wall 14 of the surround bezel 12 can comprise clips or attachment points 28, which are used to secure the surround bezel 12 to a vehicle instrument panel substrate or cluster structure.

Referring now to FIG. 2, the cluster finish panel assembly 10 is shown with the breakaway bridge bezel 20 removed therefrom. As further shown in FIG. 2, the breakaway bridge bezel 20 has a first or left side 30 and a second or right side 32. Sides 30, 32 are connected via a body portion 34 having an upper surface or A-side 37 and lower surface or B-side 38. The A-side or upper surface 37 is generally considered to be a class A surface, which is a specifically designed surface for presenting a finished appearance to the vehicle occupant. The A-side 37 can include any number of finished surfaces, such as textured or smooth finishes as dictated by the overall vehicle interior design. The B-side or lower surface 38 is a more engineered surface, having structural supports, various attachment mechanisms, and locator tabs disposed thereon, as further described below. A front wall 36 is also shown on the bridge bezel 20, which, in assembly, faces the vehicle occupant. As shown in FIG. 2, the bridge bezel 20 has been removed from the surround bezel 12. When the bridge bezel 20 is connected to the surround bezel 12, as shown in FIG. 1, sides 30, 32 of the bridge bezel 20 align with and couple to the surround bezel 12 at attachment locations in the form of attachment landings 16a and 18a, disposed at terminal ends of side walls 16, 18 of surround bezel 12.

Referring to FIG. 3, landing 16a is shown having apertures 40 and 42 disposed thereon. In the embodiment shown in FIG. 3, the apertures 40, 42 are generally oblong or oval shaped apertures which are used to releasably and operably couple the bridge bezel 20 to surround bezel 12 using fasteners described below. In the embodiment shown in FIG. 3, aperture 42 further comprises an angled portion 43, which is designed to engage an angled ramp portion of a clip or fastener disposed on the lower surface 38 of the bridge bezel 20 as further described below. Aperture 40 disposed on landing 16a is an over-sized aperture designed to engage a one-sided clip disposed on the underside 38 of the bridge bezel 20, as further described below, specifically with reference to FIG. 4. While FIG. 3 depicts an image of attachment landing 16a alone, it is contemplated that landing 18a of the surround bezel 12 is configured in a reciprocal manner with similarly configured over-sized apertures 40, as well as car-forward apertures 42.

Referring now to FIG. 4, the second side 32 of the bridge bezel assembly 20 is shown having positional locating features 62 and clips or fasteners 44 and 46 disposed thereon which operably couple the bridge bezel 20 to the surround bezel 12 in a breakaway or releasable manner. As described herein with reference to FIG. 4, the second side 32 of the bridge bezel assembly 20 is used to exemplify the function of the clips or fasteners disposed on the lower surface of the bridge bezel assembly 20 for connecting the bridge bezel 20 to the surround bezel 12. However, the description of second side 32 of bridge bezel 20 accurately describes first side 30 of the bridge bezel 20 as well, as both the first side 30 and second side 32 act in concert to releasably retain the bridge bezel 20 on the surround bezel 12. As shown in FIG. 4, a fastener in the form of a first clip 44 is disposed in a car-rearward position relative to a fastener or clip 46. As such, fasteners or clips 44, 46 form a set of fasteners adapted to be released in a car-forward sequence as an impact load is imparted on the bridge bezel 20 from a steering column during a collision event. Specifically, clip 44 will be released first in the sequence, and clip 46 will be released second in the sequence, as further described below. Clip 44 includes a triangular angled ramp section 48 which is connected to a frame portion 50 via a support 52. In this way, the ramp section 48 works as a living hinge, which can deform at support 52, such that clip 44 can engage aperture 42 of the surround bezel 12 (FIG. 3) to operably couple the bridge bezel 20 to the surround bezel 12. The ramp section 48 includes an upper ramp 48a and a lower ramp 48b, such that, when engaging aperture 42 as disposed on landing 18a, the clip frame 50 will be inserted into aperture 42 and angled portion 43 of aperture 42 will engage lower ramp 48b to deform the ramp section 48 until the clip 44 is fully secured or engaged within aperture 42. Once fully secured in aperture 42, the ramp section 48 will resiliently return to its upright condition. When the bridge bezel 20 is removed from surround bezel 12, upper ramp 48a will engage the angled portion 43 of aperture 42 to again deform the ramp section 48 of clip 44 to allow for clip 44 to be disengaged or released from aperture 42. Thus, the upper and lower ramps 48a, 48b, respectively, operate to allow for a controlled and facilitated engagement and release of clip 44 of the bridge bezel 20 to and from aperture 42 of the surround bezel 12. Clips 44 are one-sided clips in that ramp section 48 extends outwardly from the frame 50 in one direction. As such, the engagement of clip 44 with aperture 42 is lessened as compared to a double-sided clip, wherein ramp sections would be disposed in a back-to-back fashion for engagement of aperture 42.

Clip 46, as shown in FIG. 4, is disposed in a car-forward position relative to clip 44 and comprises a frame member 54 having side walls 56 and an aperture 58 in which a one-sided clip mechanism 60 is disposed. The one-sided clip mechanism 60 has dual ramped sections 60a and 60b, which can deform into aperture 58 of the clip 46 to engage aperture 40 as disposed on landing 18a of the surround bezel 12. When inserting clip 46 into aperture 40, the side walls of aperture 40 engage the dual ramp sections 60a of the one-sided clip mechanism 60, which then deforms into aperture 58 to allow for full engagement of clip 46 with aperture 40. When clip 46 is released from engagement with aperture 40, dual ramp sections 60b engage the side walls of aperture 40 to deform the one-sided clip mechanism 60, thereby allowing the clip 46 to be released from engagement with aperture 40.

Figure 5:
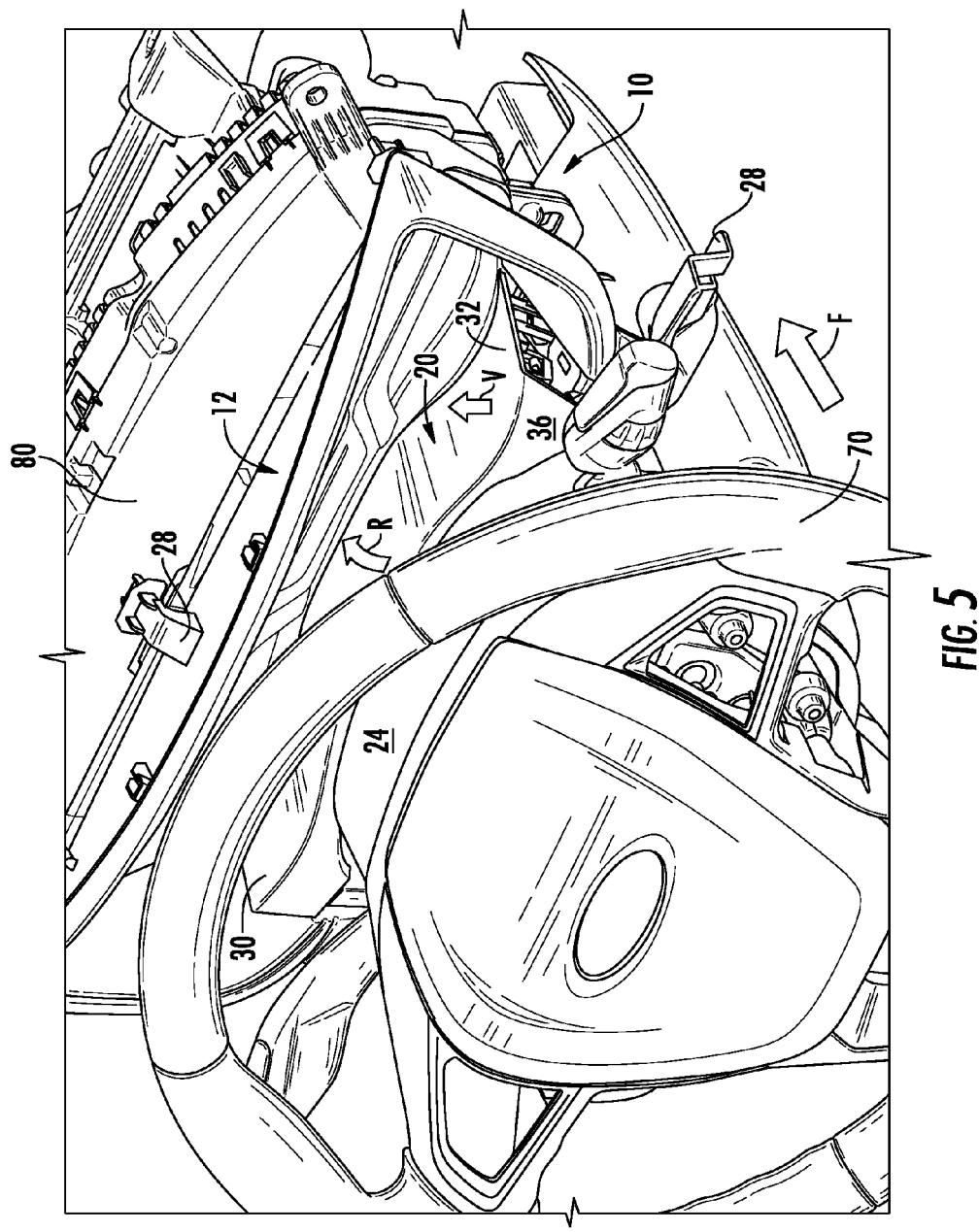
FIG. 5 is a fractional perspective view of a cluster finish panel of the present invention interacting with a steering column as an impact load is realized on the steering column.

The bridge bezel 20 of the present invention is contemplated to be a separate, injection molded component that is snap-fit directly to the mating surround bezel 12 at landings 16a and 18a of the surround bezel 12, as shown in FIG. 2. The slots or apertures 40, 42, as found on landings 16a and 18a of the surround bezel 12, are specifically designed to work with clips 44, 46 of the bridge bezel 20 to provide a controlled and tunable breakaway action when various forces are imparted on the bridge bezel 20 from a steering column. A fully assembled cluster panel 10 is shown in FIG. 5, wherein a steering column, disposed under upper shroud 24, is attached to a steering wheel 70. As indicated in FIGS. 5 and 2, the steering column is capable of imparting a forward force, as indicated by arrow F, during a collision event on the bridge bezel assembly 20. Specifically, the steering column will impart a force F on the upper shroud 24 which will contact the bridge bezel assembly 20 during a collision event and force a controlled release of the bridge bezel 20 from the surround bezel 12 as further described below.

During a front-end collision event, a secondary impact load is realized on the steering column by a vehicle occupant impacting the steering wheel column in a car-forward direction of travel. The deployment of an airbag can cause the steering column to move even further forward during a collision event. The force imparted by the steering wheel column, which is generally a slightly angled steering wheel column such that the force can be both upward and car-forward, causes the bridge bezel assembly 20 to first rotate in a direction as indicated by arrow R in FIGS. 2 and 5. This rotational movement causes the disengagement of clips 44 as found on the underside 38 of the bridge bezel assembly 20 from apertures 42 of the surround bezel 12. As the steering column continues in a car-forward direction, the steering column further imparts a force on the bridge bezel assembly 20, such that the bridge bezel assembly 20 is forced upward in a direction indicated by arrow V (FIG. 2), thereby causing the disengagement of clips 46, such that bridge bezel assembly 20 is now fully disengaged from the surround bezel 12. In this way, the entire bridge bezel assembly 20 is disengaged with the surround bezel 12, and the clips 44 and 46 disposed on the underside 38 of bridge bezel assembly 20, having resilient deformable portions as described above, remain intact in that they are not destroyed or broken during the release of the bridge bezel assembly 20 from the surround bezel 12. The first rotational movement, arrow R FIG. 5, and the second vertical movement, arrow V FIG. 5, provides for a two-part movement controlled release of the bridge bezel assembly 20 from the surround bezel 12.

As noted above, apertures 40 and 42 are specifically designed to facilitate the controlled release of the bridge bezel 20, such that bridge bezel 20 releases from the surround bezel 12 with clips 44 and 46 being released sequentially in a car-forward release sequence direction. With reference to FIGS. 2-4, clips 44 are released from apertures 42 during the rotational movement of the bridge bezel assembly 20 indicated by arrow R (FIGS. 2 and 5). The clips 46 also rotate with the bridge bezel assembly 20 during this rotation movement R, and the upward force V is then imparted on the bridge bezel assembly 20 to release the now rotated clips 46. Thus, apertures 40, which engage clips 46, are oversized apertures which are configured to release clips 46 even after clips 46 have been rotated in a direction as indicated by arrow R during the first movement of the bridge bezel 20. The oversized configuration of apertures 40 allows for clips 46 to disengage from apertures 40 when positioned at a rotated angle within apertures 40. Further, it is contemplated that the controlled release of the bridge bezel is further realized by the differences in breakaway force necessary to release clips 40 as compared to clips 46. In the present invention, clips 44, which are released in a first rotational movement of the bridge bezel 20 as indicated by arrow R, require a lower breakaway force to disengage the surround bezel 12 as compared to the larger and more substantial clips 46 having dual ramped sections 60a, 60b. In this way, as the rotational force R is imparted on the bridge bezel 20, clips 44 will be the first to be released in a release sequence followed by clips 46, which are released with the vertical movement V of the bridge bezel 20. With a greater breakaway force necessary to release clips 46 as compared to the breakaway force necessary to release clips 44, the bridge bezel 20 of the present invention will always release in a controlled car-forward release sequence as a force from a steering column is imported on the bridge bezel 20.

A gap concealing material is disposed between the upper shroud 24 and the bridge bezel assembly 20 to conceal the gap created between the bridge bezel assembly 20 and the upper shroud 24. The gap concealing material disposed between upper shroud 24 and bridge bezel assembly 20 is indicated as reference numeral 29 in FIG. 1. The gap concealing material 29 is comprised of a flexible material, such as vinyl or cloth. The gap concealing material 29 is connected at a first end to the underside 38 of the bridge bezel assembly 20 in a permanent fashion, such as by heat staked pins, which permanently couple the gap concealing material 29 to the bridge bezel assembly 20. The gap concealing material is further coupled to the upper shroud 24 at a second end in a similar permanent fashion. In this way, the gap concealing material acts as a tether to the bridge bezel assembly 20 when it is released from the surround bezel 12. With the gap concealing material 29 in place operably coupling the bridge bezel 20 to the upper shroud 24 in a flexible manner, the bridge bezel assembly 20 will not be free to move as a projectile in the vehicle interior when released from the surround bezel 12 during a collision event. The overall length and flexibility of the gap concealing material 29 ensures that the material will not impede the release of the bridge bezel assembly 20 from the surround bezel 12 during car-forward travel of the steering column during a collision event.

In the embodiment shown in FIG. 4, the car-forward clips 46 are one-sided dual ramped fastener release clips, and the car-rearward clips 44 are one-sided molded-in clips, in which clips 44 are contemplated to be formed as part of the injection molding process for bridge bezel 20. It is contemplated that the sides 30, 32 (FIG. 2) of the bridge bezel assembly 20 can have any arrangement of clips disposed on the underside 38 thereof. For instance, the car-forward and car-rearward clips can both be molded-in clips, such as clips 44 shown in FIG. 4. Also, the car-forward and car-rearward clips can be one-sided dual ramped fastener release clips, such as clips 46 shown in FIG. 4.

Further, the position of clips 44 and 46, as shown in FIG. 4, can be reversed, such that the molded-in clip 44 can be car-forward relative to one-sided fastener release clip 46. In this way, the bridge bezel assembly 20 can be customized to control the direction and other characteristics of the release of the bridge bezel 20 from the surround bezel 12 given the differences in breakaway force required to release clips 46 as compared to clips 44. In a preferred embodiment shown in FIG. 4, the molded-in clips 44 are car-rearward of the one-sided dual ramped fastener release clips 46, which provides for a reduced breakaway force necessary to release the molded-in clips 44 from apertures 42 as compared to the breakaway force required to release clips 46 from, apertures 40 when an impact load is realized on the bridge bezel assembly 20 from the steering column during a collision event. Again, as noted above, the rotation R (FIG. 2) of the bridge bezel assembly 20 is a first movement of the bridge bezel assembly 20, which releases clips 44 first in a car-forward release sequence. The vertical movement V (FIG. 2) of the bridge bezel assembly 20 is a second movement of the bridge bezel 20 in the car-forward release sequence, which causes the release of one-sided dual ramped fastener release clips 46 from oversized apertures 40 for full disengagement of the bridge bezel assembly 20 from the surround bezel 12.

The cluster finish panel 10 of the present invention provides a unique bridge bezel design, which provides a proper fit and finish for vehicle interiors while also providing a tunable and controlled release action to breakaway the bridge bezel during the advancement of a steering column caused by forward impact load being imparted on the steering column by a vehicle occupant or by deployment of an airbag due to a collision event. The controlled and tunable release of the bridge bezel assembly 20 is achieved through a unique combination of the car-rearward positioned molded-in clips 44 (FIG. 4) along with the car-forward one-sided plastic release clips 46. The tunable feature in the design is realized due to the car-rearward molded-in clips 44 allowing for the bridge bezel 20 to release at a lower breakaway force or controlled force during the rotation R of the bridge bezel assembly 20.

Thus, the full breakaway force necessary to release the bridge bezel 20 from the surround bezel 12 is minimized as the steering column advances in a car-forward direction of travel to a full forward position during a collision event.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A cluster panel assembly comprising:
a surround bezel having first and second attachment landings;
a bridge bezel having first and second ends adapted to align with the first and second attachment landings of the surround bezel; and
first and second fasteners disposed on each of the first and second ends of the bridge bezel adapted to releasably engage the attachment landings of the surround bezel, wherein the bridge bezel is disposed adjacent a steering column capable of imparting a force on the bridge bezel causing a first movement of the bridge bezel in the form of a rotational movement of the bridge bezel causing a disengagement of the first fasteners from the surround bezel, and further wherein the force imparted by the steering column causes a second movement subsequent to the first movement of the bridge bezel in the form of a vertical movement of the bridge bezel causing a disengagement of the second fasteners from the surround bezel.

2. The cluster panel assembly of claim 1, wherein:
the second fasteners are disposed on the first and second ends of the bridge bezel in front of the first fasteners.

3. The cluster panel assembly of claim 2, including:
first and second apertures disposed on each of the first and second attachment landings of the surround bezel and adapted to be releasably engaged by the first and second fasteners of the bridge bezel, wherein the second apertures are disposed in front of the first apertures of the first and second attachment landings of the surround bezel.

4. The cluster panel assembly of claim 3, wherein:
the second apertures are oblong apertures adapted to continuously engage the second fasteners during the rotational movement of the bridge bezel.

5. The cluster panel assembly of claim 3, wherein:
the first and second fasteners are each configured to have an associated breakaway force necessary to disengage the first and second fasteners of the bridge bezel from the first and second apertures of the surround bezel, and further wherein the associated breakaway force necessary to disengage the first fasteners is less than the associated breakaway force necessary to disengage the second fasteners.

6. The cluster panel assembly of claim 1, wherein:
the first and second movements of the bridge bezel assembly define a controlled release sequence of the bridge bezel from the surround bezel, wherein the first and second fasteners of the bridge bezel assembly release sequentially.

7. The cluster panel assembly of claim 1, wherein:
the surround bezel further comprises a generally U-shaped configuration with first and second sidewalls having a crossbar disposed therebetween, and further wherein the first and second attachment landings are disposed at terminal ends of the first and second side walls of the surround bezel.

8. The cluster panel assembly of claim 1, including:
a tether assembly operably coupled to the steering column and the bridge bezel and adapted to tether the bridge bezel to the steering column when the bridge bezel is disengaged from the surround bezel.

9. A cluster panel assembly, comprising:
a bridge bezel releasably coupled to a vehicle interior and disposed adjacent a steering column, the bridge bezel having at least two attaching ends for coupling the bridge bezel to the vehicle interior, wherein the attaching ends comprise first and second fasteners adapted to be released in sequence as an impact load is imparted on the bridge bezel from the steering column during a collision event;
first and second fasteners disposed on the at least two attaching ends, wherein the second fasteners are disposed on the attaching ends of the bridge bezel in front of the first fasteners;
a surround bezel disposed on the vehicle interior having first and second attachment landings; and
first and second apertures disposed on each of the first and second attachment landings of the surround bezel adapted to be releasably engaged by the first and second fasteners of the bridge bezel, wherein the second apertures are disposed in front of the first apertures of the first and second attachment landings of the surround bezel, wherein the second apertures are oblong apertures adapted to continuously engage the second fasteners during a rotational release movement of the bridge bezel.

10. The cluster panel assembly of claim 9, wherein:
the first and second fasteners are each configured to have an associated breakaway force necessary to disengage the first and second fasteners of the bridge bezel from the first and second apertures of the surround bezel, and further wherein the associated breakaway force necessary to disengage the first fasteners is less than the associated breakaway force necessary to disengage the second fasteners.

11. The cluster panel assembly of claim 9, including:
a tether assembly operably coupled to the steering column and the bridge bezel and adapted to tether the bridge bezel to the steering column when the bridge bezel is disengaged from the vehicle interior.

12. A cluster panel assembly comprising:
a bridge bezel releasably coupled to a surround bezel by a plurality of fasteners, wherein the bridge bezel is disposed adjacent a steering column;
a tether assembly operably coupled to the steering column and the bridge bezel; and
wherein the fasteners are adapted to be released in sequence as an impact load is imparted on the bridge bezel from the steering column during a collision event.

13. The cluster panel assembly of claim 12, wherein:
the plurality of fasteners comprises first and second fasteners, wherein the second fasteners are disposed on first and second ends of the bridge bezel in front of the first fasteners.

14. The cluster panel assembly of claim 13, including:
first and second apertures disposed on first and second attachment landings of the surround bezel and adapted to be releasably engaged by the first and second fasteners of the bridge bezel, wherein the second apertures are disposed in front of the first apertures of the first and second attachment landings of the surround bezel.

15. The cluster panel assembly of claim 14, wherein:
the first and second fasteners are each configured to have an associated breakaway force necessary to disengage the first and second fasteners of the bridge bezel from the first and second apertures of the surround bezel, and further wherein the associated breakaway force necessary to disengage the first fasteners is less than the associated breakaway force necessary to disengage the second fasteners.

16. The cluster panel assembly of claim 15, wherein:
the steering column is capable of imparting a force on the bridge bezel during a collision event causing a first movement of the bridge bezel in the form of a rotational movement of the bridge bezel causing a disengagement of the first fasteners from the surround bezel, and further wherein the force imparted by the steering column causes a second movement subsequent to the first movement of the bridge bezel in the form of a vertical movement of the bridge bezel causing a disengagement of the second fasteners from the surround bezel.

17. The cluster panel assembly of claim 16, wherein:
the second apertures are oblong apertures adapted to continuously engage the second fasteners during the rotational movement of the bridge bezel.

* * * * *